(12) United States Patent
Westphal et al.

(10) Patent No.: US 10,672,216 B2
(45) Date of Patent: Jun. 2, 2020

(54) SYSTEM AND METHOD FOR USING A MOBILE DEVICE TO ACCESS INVENTORY

(71) Applicant: W.W. Grainger, Inc., Lake Forest, IL (US)

(72) Inventors: Geoffry A. Westphal, Evanston, IL (US); James Finn, Palatine, IL (US); Qianyu Rui, Mundelein, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 16/181,903

(22) Filed: Nov. 6, 2018

(65) Prior Publication Data

US 2019/0139352 A1    May 9, 2019

Related U.S. Application Data

(60) Provisional application No. 62/582,435, filed on Nov. 7, 2017.

(51) Int. Cl.
*G07F 11/00*    (2006.01)
*G06Q 20/32*    (2012.01)
*G07F 11/24*    (2006.01)

(52) U.S. Cl.
CPC ....... *G07F 11/002* (2013.01); *G06Q 20/3224* (2013.01); *G06Q 20/3278* (2013.01); *G07F 11/24* (2013.01)

(58) Field of Classification Search
CPC ... G07F 11/002; G07F 11/24; G06Q 20/3224; G06Q 20/3278
See application file for complete search history.

(56) References Cited

U.S. PATENT DOCUMENTS

| | | | |
|---|---|---|---|
| 2011/0159857 A1* | 6/2011 | Faith | G06Q 30/0201 455/414.3 |
| 2012/0136478 A1* | 5/2012 | Anand | G07F 9/026 700/237 |
| 2016/0058236 A1* | 3/2016 | Meyers | A47J 31/407 99/290 |

\* cited by examiner

*Primary Examiner* — Laura A Gudorf
(74) *Attorney, Agent, or Firm* — Greenberg Traurig, LLP

(57) ABSTRACT

A system and method for using a mobile device to cause a vending machine to provide access to a product. After a calibration position is established within the mobile device, an accelerometer of the mobile device is used to determine a current location of the mobile device relative to the vending machine resulting from a movement of the mobile device from the calibration position. A product location to mobile device location mapping is then used to determine a one of a plurality of vending mechanisms associated with the vending machine that is to be activated given the determined current location of the mobile device. A signal may then be sent from the mobile device to the vending machine to instruct the vending machine to activate the determined one of the plurality of vending mechanisms.

22 Claims, 2 Drawing Sheets

SYSTEM AND METHOD FOR USING A MOBILE DEVICE TO ACCESS INVENTORY

RELATED APPLICATION INFORMATION

This application claims the benefit of U.S. Provisional Application No. 62/582,435, filed on Nov. 7, 2017, the disclosure of which is incorporated herein by reference in its entirety.

BACKGROUND

In various environments or contexts, products need to be accessed and/or ordered. This can be at home, in an office, in a business-to-business (B2B) setting, e.g., in a tool crib or in a vending machine, etc. Currently, one solution to this need is to place an order button in the vicinity of the product to be ordered. In a domestic setting, an order button to order laundry detergent can be placed on or near the washing machine. In a B2B tool crib setting, an order button can be place on or near the bin holding the product for which ordering is needed.

Current order buttons contain a battery and a means for using a protocol for transmitting a signal (e.g., via WiFi, cell network, Bluetooth, etc.) to a network and subsequently to a vendor's server, which will process the "order transaction" and, in one scenario, ship the product to the destination corresponding to the order button and, in another scenario, to a location that has holding lockers from which the customer will pick up the product(s).

SUMMARY

The following generally describes a system and method that improves upon the current state of the art, particular with respect to currently implemented order buttons. For example, the systems and methods describe hereinafter, which utilize a mobile device with one or more accelerometers to determine where in space the mobile device is located, will eliminate the need for multiple order buttons for multiple products, will allow for the identification of the individual interacting with the system (e.g., via use of a biometric sensor such as a fingerprint sensing system, face recognition system, voice recognition system, retina scanning system, etc.), will allow for the scheduling of order deliveries, will allow for the ordering of kits (groups of products together), will allow for additional purchasing opportunities when a given product is ordered, will allow for an approval process, will work with open bins and vending machines, will allow for interaction with product information associated with products (e.g., within bins, vending machines, etc.), will allow for the recommendation of an alternative or equivalent product if product within a bin, vending machine, etc. is missing and/or does not have enough product to satisfy the user's requirements, will alert users when they are unauthorized to take a given product, will alert users when they are attempting to take a product that is incompatible with their job description or role, will alert users when product is otherwise reserved for another user, and/or provide further improvements that will be appreciated by those of skill in the art after reading the disclosure contained herein.

BRIEF DESCRIPTION OF THE DRAWINGS

For a better understanding of the subject invention, reference may be had to preferred embodiments shown in the attached drawings in which.

DETAILED DESCRIPTION

Figure 1:
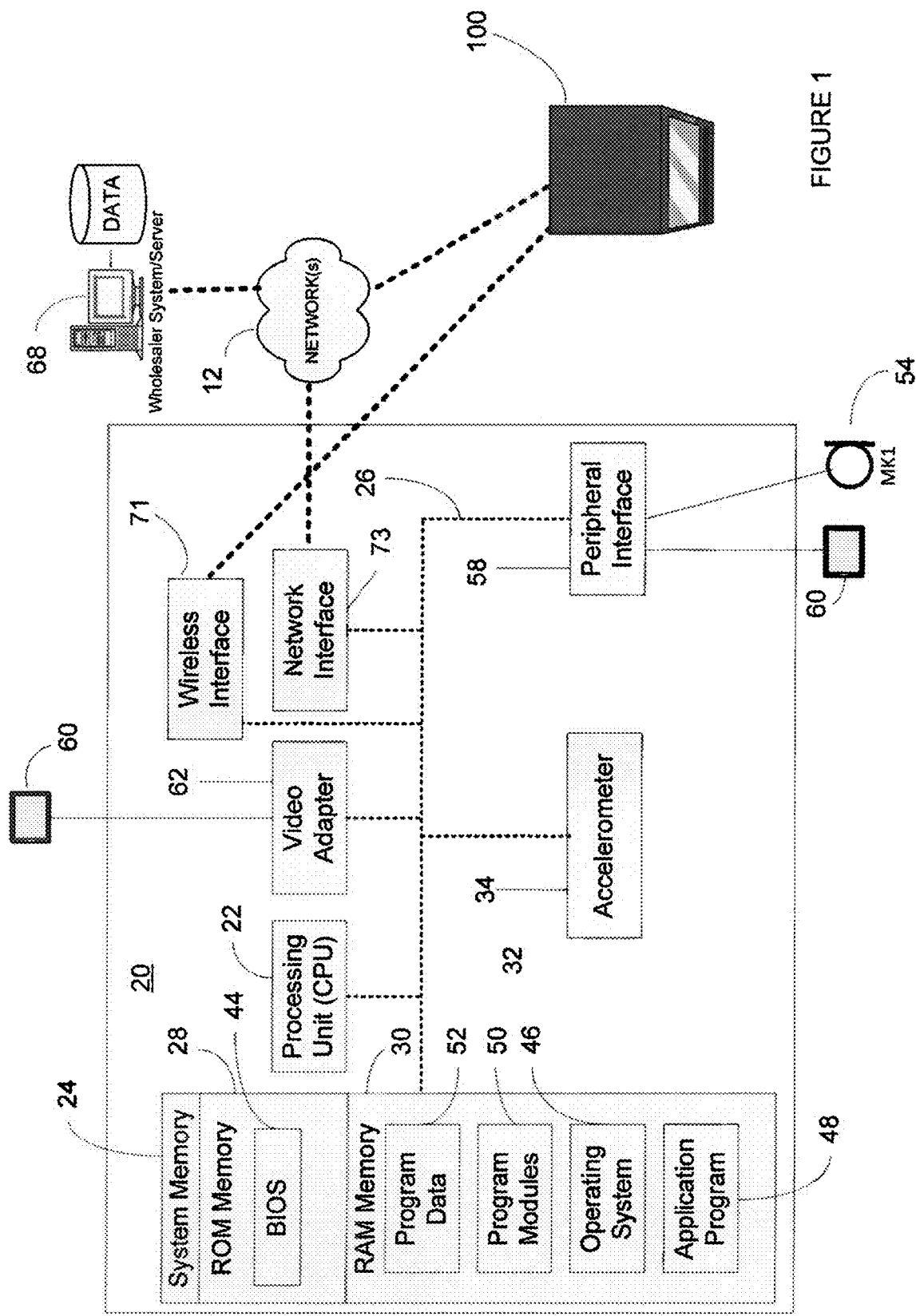
FIG. 1 is a block diagram illustrating components of an example network system in which the subject method may be employed.

With reference to the figures, a system and method is hereinafter described for providing access to product, particularly for providing access to product in a vending machine environment and/or for ordering product/replenishing product. While not intended to be limiting, the system and method will be described in the context of a plurality of processing devices linked via a network, such as a local area network or a wide area network, as illustrated in FIG. 1. In this regard, a mobile device 20, e.g., a mobile phone, tablet computing device, a smart watch, etc., is provided with executable instructions to, for example, provide a means for a consumer, i.e., a user, to position the mobile device 20 at a location of interest and to use the mobile device 20 to access product(s) of interest, e.g., from a vending machine 100, to issue a communication to a remote processing device, i.e., a vendor server system 68, via the network to, among other things, allow the vendor server system 68 to initial an order for product, to track inventory usage at a particular site (e.g., a bin, a vending machine, etc.), to initiate a restocking of inventory at a particular site, to retrieve product related information for display to the user via the mobile device 20, and/or the like. Generally, the computer executable instructions reside in program modules which may include routines, programs, objects, components, data structures, etc. that perform particular tasks or implement particular abstract data types. Furthermore, while described and illustrated in the context of a single mobile device 20, those skilled in the art will also appreciate that the various tasks described hereinafter may be practiced in a distributed environment having multiple processing devices linked via a local or wide-area network, e.g., in a cloud computing environment, whereby the executable instructions may be associated with and/or executed by one or more of multiple processing devices.

For performing the various tasks in accordance with the executable instructions, the mobile device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the mobile device 20 as needed. The non-transient, computer-readable media allows for the nonvolatile storage of computer readable instructions, data structures, program modules and other data for the mobile device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the mobile device 20, such as during start-up, may be stored in ROM 28. Similarly, the RAM 30 may be used to store computer executable instructions comprising an operating system 46, one or more applications programs 48 (such as a Web browser, the product access app described hereinafter, etc.), other program modules 50, and/or program data 52. Still further, computer-executable instructions may be downloaded to one or more of the computing devices as needed, for example, via a network connection.

An end-user, e.g., a consumer, may interact with the mobile device 20, e.g., enter commands and information into the mobile device 20 through input devices such as a touch screen 60, microphone 54, etc. In addition, movement of the mobile device 20 will be sensed via use of one or more MEM accelerometers 34. While not illustrated, other input devices may include a camera, a joystick, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information generated via use of the processing device 22, a touchpad 60 or other type of display device may also be connected to the bus 26 via an interface, such as a video adapter 62. In addition to the touch pad 60, the mobile device 20 may also include other peripheral output devices, not shown, such as speakers and printers.

The mobile device 20 may also utilize logical connections to one or more remote processing devices, such as the vendor server system 68 having one or more associated data repositories, e.g., storing a database of product information, user related information, product access information, inventory management information, etc. In this regard, while the server system 68 has been illustrated in the exemplary form of a computer, it will be appreciated that the server system 68 may, like mobile device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network. Additionally, the server system 68 may have logical connections to other third party server systems via the network 12, e.g., shipping providers, third party product vendors, etc., and, via such connections, will be associated with data repositories that are associated with such other third party server systems.

Thus, for performing tasks as needed, the server system 68 may include many or all of the elements described above relative to the mobile device 20. By way of further example, the server system 68 includes executable instructions stored on a non-transient memory device for, among other things, handling search requests, providing search results, providing access to context related services, sending emails, etc. Communications between the mobile device 20 and the server system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the mobile device 20, or portions thereof, may be stored in the memory storage device(s) of the server system 68.

In certain circumstances, the mobile device 20 may also include a wireless interface 71, e.g., a Bluetooth interface, etc., for directly communicating signals to further devices, such as vending machine 100. In certain other circumstances, the mobile device 20 may utilize the network 12 to also or alternatively communicate signals to other devices, such as the vending machine 100. In such circumstances, the vending machine 100 would include corresponding interface (s) and would likewise have a processing device, a memory storing instructions executable by the processing device, and the like in additional to otherwise conventional, vending machine componentry. Again, it will be appreciated that the vending machine 100 need not be implemented as a single device but may be implemented in a manner such that the tasks performed by the vending machine 100 are distributed to a plurality of processing devices linked through a communication network. Additionally, the vending machine 100 may also have logical connections to other third party server systems via the network 12, e.g., shipping providers, third party product vendors, etc., and, via such connections, will be associated with data repositories that are associated with such other third party server systems.

In operation, the subject system and method recognizes that each object has a unique coordinate in space—whether based on a cartesian coordinate system or a polar coordinate system. Accordingly, a determined location of the mobile device 20 in space can be utilized to determine a bin, vending machine coil, etc. the mobile device 20 is adjacent to. Furthermore, when the bin, vending machine coil, etc. that the mobile device 20 is adjacent to is determined, an interaction with the mobile device 20 can be used to perform numerous product related functions. For example, a product within a bin, vending machine, etc. can be purchased (or the vending machine caused to deliver the product) whether automatically or in response to the user performing a gesture with the mobile device 20, e.g., by jerking the mobile device 20, tapping on the touch screen 60 of the mobile device 20, entering a quantity on a user interface provided upon the touch screen 60 of the mobile device 20, speaking a voice command, etc. Furthermore, the identity of the user can be discerned during this process, e.g., for security purposes, via use of facial recognition, voice recognition, finger print recognition or the like. In this manner, the mobile device 20 can be caused to issue a communication to the vendor system server 68 and/or the vending machine 100 to cause the desired action to be performed as described in greater detail below.

Figure 2:
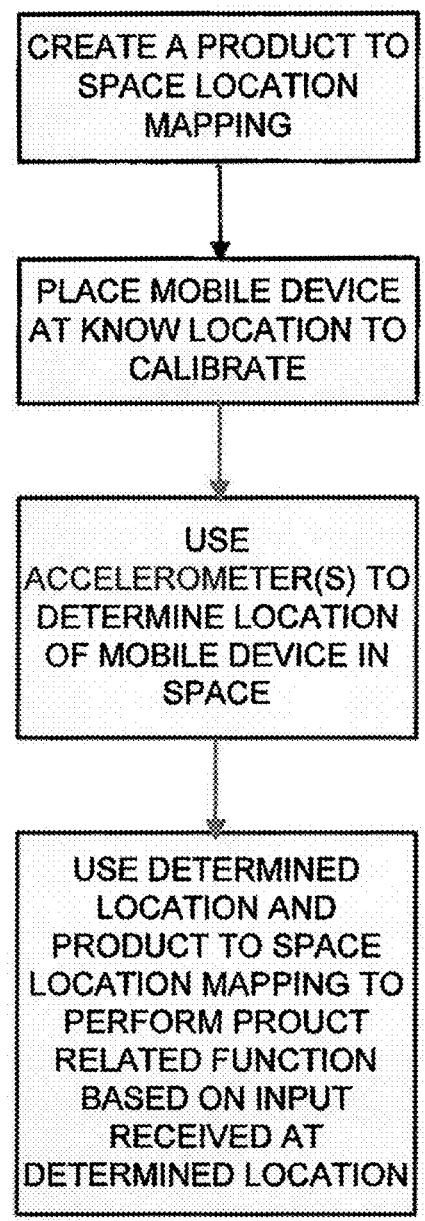
FIG. 2 is a flow chart diagram of an example method for using a mobile device to access and/or invoke product related functionalities.

More particularly, with reference to FIG. 2, the system and method functions by first calibrating the mobile device 20 to a known or predetermined location, e.g., a specific X,Y,Z coordinate in space. For example, the know location can be a location adjacent to a front portion of a vending machine which may be labeled as "place mobile phone here to calibrate." Once the mobile device 20 is placed at the known location, an input would typically be provided to the mobile device 20, e.g., via interaction with the touch screen 60, via the microphone 54, via a signal received from a device associated with the location, e.g., an NFC emitter, or the like to inform the mobile device 20 that movement of the mobile device 20 is to now be tracked. In this regard, once the mobile device 20 is calibrated to a known location, signals generated by the accelerometer(s) 34 can be used to determine how the mobile device 20 is being moved in space. Specifically, because velocity and acceleration are known to be the first and second derivative of displacement and because the mobile device 20 has been calibrated to a known location, displacement of the mobile device 20 from the known location and, accordingly the location in space of the mobile device 20, can be calculated via use of the accelerometer(s) 34. Thus, if one is at home, the mobile device 20 can determine that it has been moved from a known location to a location in space that is in front of a washing machine, a dryer, a refrigerator, the garage, a deck, etc. and, likewise, in a B2B environment, the mobile device 20 can determine that it has been moved from a known location to a location in space that is in front of a vending machine coil, a product bin, etc. To this end, this process can also be used to create a location to product mapping for storage in a memory device associated with the mobile device 20, the server system 68, or vending machine 100 whereby a subsequent execution of this process can utilize the created mapping to determine a product that is to be associated with an action that is to be performed (e.g., to order the product, to cause the product to be output from the vending machine, view product related information, or the like) when the mobile device 20 is again moved to that same location in space—whether absolute or relative. For example, when the mobile device 20 is determined to be positioned in front of the washer, the system can cause a pop-up for product, e.g., soap, bleach, etc., to be displayed to the user whereby the user can request, via input, that the product be ordered for delivery to the user. It will therefore be appreciated that, via use of this methodology, the need for providing multiple product related buttons (which undesirably require batteries, etc.) at multiple locations can be avoided.

By way of further example, when entering a grocery store, the mobile device 20 can be calibrated to a known location. Thereafter, as the user walks around the store, the mobile device 20 will know at which location the mobile device 20 is currently positioned relative to the calibration location and the product that is assigned to that location, for example via use of the product to location mapping. Product can then be added to a logical or physical cart and the user can pay as they shop using a commerce application installed on the mobile device 20. To this end, an interaction with the mobile device 20 can be used to cause a signal to be generated to a system server to indicate that the user is performing a product related action at the determined location as described previously.

Likewise, in a B2B environment, the mobile device 20 can be calibrated to a known location relative to a tool bin crib. As the mobile device 20 is moved in front of the bins, the user can indicate to the mobile device 20 that a product (or a quantity of product) is being removed from a bin. Because it is known what product is within a bin that corresponds to the current location of the mobile device 20, a signal can be sent to a system server to thereby allow inventory usage to be tracked/managed. In addition, if biometric sensors are used, a signal can also be sent to the system server to thereby inform the system server of the specific individual that is taking product from a bin. In some instances, a camera resident on the mobile device 20 can be used to capture a picture or video of the bin and/or the user and provide the captured picture or video to the system server for additional use as desired. In the case of a vending machine, a similar process may be performed with the additional step of the mobile device 20 instructing the vending machine 100 to active a given coil, to open a particular door, etc. to thereby allow the user to gain access to the product. In this instance, the camera may be particularly useful to verify that the correct product was actually dispensed by the vending machine 100 as part of this process.

To further illustrate the disclosed systems and methods, the following presents example use cases.

Taking a single product (QTY=1) from a tool crib bin.

A user enters a tool crib. The user calibrates the mobile device 20 using the app. This is done by placing the mobile device 20 in a predetermined location, preferably near or in the tool crib, and pressing a Calibrate button or otherwise instructing the mobile device 20 to perform the calibration function. This action now internally sets the location to known values, whether logical or physical. The user moves the mobile device 20 to a location in the tool crib which is substantially near the bin of the product the users wants to take. When the device is held in the desired position for a threshold amount of time, i.e., held without substantially departing from a given location, or otherwise receives an indication that the mobile device 20 is at the desired location, a default transaction quantity of 1 is assumed and the system "places the item in the shopping cart". The user takes one item and interacts with the mobile device 20 to indicate the transaction is complete. This interaction could be a Complete Order button press on the touchscreen of the mobile device 20, could be a voice command, could be a tap on the mobile device 20, or a tap on, in the case of a wearable, a body part near the wearable device. This interaction then creates a message with information about the product identifier and the quantity taken and sends it over a network (wifi, Bluetooth, mesh network, Internet, cell, etc.) to the vendor's server 68, which records the transaction and updates the vendor's databases appropriately. The message could be a proprietary protocol, a message in XML format, or a message in a standard EDI format (e.g., X12 standard).

In the event that are not products left in the bin, the user can interact with the mobile device 20 and request the location for an alternative product or function equivalent product. That product, or products, could be in the same tool crib, another tool crib on premise, in a nearby vending machine, or at a local store (for pickup or placement into a locker system). The user may then proceed to the location of the alternate product with directions being given to the user how to navigate to that location. This would be possible by providing a vendor database with fields which map product to bin locations of alternate products for the base product.

Taking a single product (QTY=n>1) from a tool crib bin.

A user enters a tool crib. The user calibrates the mobile device 20 using the app. This is done by placing the mobile device 20 in a predetermined location, preferable near or in the tool crib, and pressing a Calibrate button. This action now internally sets the location to known values, whether logical or physical. The user moves the mobile device 20 to a location in the tool crib which is substantially near the bin of the product the users wants to take. The user takes more than one item from the bin and interacts with the device to indicate the number of items taken. This can be accomplished by interacting with a number pad in the touch interface of the mobile device 20 and entering the number of items taken. Alternatively, it can be accomplished by saying the number or items taken, or it can be accomplished by tapping on the device or on a body part near the device if it is wearable, the number of taps corresponding to the quantity taken and placed into the shopping cart. The user then interacts with the app to indicate the transaction is complete. This interaction could be a Complete Order button press on the touchscreen of the mobile device, could be a voice command, could be a tap on the mobile device, or a tap on, in the case of a wearable, a body part near the wearable device. This interaction then creates a message with information about the product identifier and the quantity taken and sends it over a network (wifi, Bluetooth, mesh network, Internet, cell, etc.) to a vendor's server, which records the transaction and updates the vendor's databases appropriately. The message could be a proprietary protocol, a message in XML format, or a message in a standard EDI format (e.g, X12 standard).

If the user inputs a quantity of more than a certain threshold, the user may be alerted as to what the maximum number of product they are allowed to take. For this purpose, the vendor database may have a field for each product and the maximum quantity of each product each user is allowed to take over a specified period of time. It is also possible that the maximum quantity of a product a user can take is zero, meaning the user is not allowed to take this product at all.

Taking 1 or more products from 1 or more bins.

A user enters a tool crib. The user calibrates the mobile device 20 using the app. This is done by placing the mobile device 20 in a predetermined location, preferable near or in the tool crib, and pressing a Calibrate button. This action now internally sets the location to known values, whether logical or physical. The user then moves the mobile device 20 to a location in the tool crib which is substantially near the bin of the product the users wants to take. The user takes more than one item from the bin and interacts with the mobile device 20 to indicate the number of items taken. This can be accomplished by interacting with a number pad in the touch interface of the mobile device 20 and entering the number of items taken. Alternatively, it can be accomplished by saying the number or items taken, or it can be accomplished by tapping on the mobile device 20 or on a body part near the mobile device 20 if it is wearable, the number of taps corresponding to the quantity taken. The user then indicates to the app that another item will be added to the shopping cart. The steps in this paragraph are repeated until the user indicates the transaction is complete.

The user then presses Complete Order button press on the touchscreen of the mobile device 20. This could also be a voice command, could be a tap on the mobile device, or a tap on, in the case of a wearable, a body part near the wearable device. This interaction then creates a message with information about the product identifier and the quantity taken and sends it over a network (wifi, Bluetooth, mesh network, Internet, cell, etc.) to a vendor's server, which records the transaction and updates the vendor's databases appropriately. The message could be a proprietary protocol, a message in XML, format, or a message in a standard EDI format (e.g, X12 standard).

Retrieving a kit from a tool crib with tool crib navigational aid.

A user enters a tool crib. The user calibrates the mobile device 20 using the app. This is done by placing the mobile device 20 in a predetermined location, preferable near or in the tool crib, and pressing a Calibrate button. This action now internally sets the location to known values, whether logical or physical.

The user may not know where a particular bin is located in the tool crib. Since all coordinates are known for all the bins, the mobile app can indicate in which direction to move the device to reach a location in the tool crib which is substantially near the bin of the product the users wants to take. The user takes more than one item from a prescribed list of product from the bin and interacts with the mobile device 20 to indicate the number of items taken. This can be accomplished by interacting with a number pad in the touch interface of the mobile device 20 and entering the number of items taken. Alternatively, it can be accomplished by saying the number or items taken, or it can be accomplished by tapping on the mobile device 20 or on a body part near the mobile device 20 if it is wearable, the number of taps corresponding to the quantity taken. The user then indicates to the app that another item will be added to the shopping cart. The steps in this paragraph are repeated for each product in a prescribed list until the user indicates the transaction is complete.

The user then presses Complete Order button press on the touchscreen of the mobile device 20. This could also be a voice command, could be a tap on the mobile device 20, or a tap on, in the case of a wearable, a body part near the wearable device. This interaction then creates a message with information about the product identifier and the quantity taken and sends it over a network (wifi, Bluetooth, mesh network, Internet, cell, etc.) to a vendor's server, which records the transaction and updates the vendor's databases appropriately. The message could be a proprietary protocol, a message in XML, format, or a message in a standard EDI format (e.g, X12 standard).

Retrieving 1 item (QTY=1) from a vending machine coil.

A user stands in front of the vending machine 100. The user calibrates the mobile device 20 using the app. This is done by placing the mobile device 20 in a known location, preferable near the vending machine 100, and pressing a Calibrate button. This action now internally sets the location to known values, whether logical or physical. The user moves the device to a location substantially in front of the product the users wants to take. By interacting with the app, a signal can be sent to the vending machine using one of a known number of protocols over one of a number of known networking technologies to activate the coil corresponding the item the mobile device is in front of and dispense that item. A default transaction quantity of 1 is assumed.

The user then interacts with the mobile device 20 to indicate the transaction is complete. This interaction could be a Complete Order button press on the touchscreen of the mobile device, could be a voice command, could be a tap on the mobile device, or a tap on, in the case of a wearable, a body part near the wearable device. This interaction then creates a message with information about the product identifier and the quantity taken (1 in this case) and sends it over a network (wifi, Bluetooth, mesh network, Internet, cell, etc.) to a vendor's server, which records the transaction and updates the vendor's databases appropriately. The message could be a proprietary protocol, a message in XML format, or a message in a standard EDI format (e.g, X12 standard).

Retrieving 1 item (QTY>1) from a vending machine coil.

A user stands in front of the vending machine 100. The user calibrates the mobile 20 device using the app. This is done by placing the mobile device 20 in a known location, preferable near the vending machine 100, and pressing a Calibrate button. This action now internally sets the location to known values, whether logical or physical. The user moves the device to a location substantially in front of the product the users wants to take. By interacting with the app, a signal can be sent to the vending machine 100 using one of a known number of protocols over one of a number of known networking technologies to indicate which coil is going to be activated, that more than one item is going to be dispensed.

The user then indicates how many items are desired to be dispensed. This can be accomplished by interacting with a number pad in the touch interface of the mobile device 20 and entering the number of items taken. Alternatively, it can be accomplished by saying the number or items taken, or it can be accomplished by tapping on the mobile device 20 or on a body part near the mobile device 20 if it is wearable, the number of taps corresponding to the quantity taken and placed into the shopping cart.

The user then interacts with the mobile device 20 to indicate the transaction is complete. This interaction could be a Complete Order button press on the touchscreen of the mobile device 20, could be a voice command, could be a tap on the mobile device 20, or a tap on, in the case of a wearable, a body part near the wearable device. This interaction then creates a message with information about the product identifiers and the quantity taken and sends it over a network (wifi, Bluetooth, mesh network, Internet, cell, etc.) to a vendor's server, which records the transaction and updates the vendor's databases appropriately. The message could be a proprietary protocol, a message in XML, format, or a message in a standard EDI format (e.g, X12 standard).

Retrieving 1 or more items (QTYs>1) from 1 or more vending machine coils.

A user stands in front of the vending machine 100. The user calibrates the mobile device 20 using the app. This is done by placing the device in a known location, preferable near the vending machine 100, and pressing a Calibrate button. This action now internally sets the location to known values, whether logical or physical. The user moves the mobile device 20 to a location substantially in front of the product the users wants to take. By interacting with the app, a signal can be sent to the vending machine 100 using one of a known number of protocols over one of a number of known networking technologies to indicate which coil is going to be activated, that more than one item is going to be dispensed.

The user then indicates how many items are desired to be dispensed. This can be accomplished by interacting with a number pad in the touch interface of the mobile device 20 and entering the number of items taken. Alternatively, it can be accomplished by saying the number or items taken, or it can be accomplished by tapping on the mobile device 20 or on a body part near the mobile device 20 if it is wearable, the number of taps corresponding to the quantity taken and placed into the shopping cart. The user then moves to the mobile device 20 to another location in front of the vending machine and repeats these steps until no further items need to be dispensed.

The user then interacts with the mobile device 20 to indicate the transaction is complete. This interaction could be a Complete Order button press on the touchscreen of the mobile device, could be a voice command, could be a tap on the mobile device, or a tap on, in the case of a wearable, a body part near the wearable device. This interaction then creates a message with information about the product identifiers and the quantities taken and sends it over a network (wifi, Bluetooth, mesh network, Internet, cell, etc.) to a vendor's server, which records the transaction and updates the vendor's databases appropriately. The message could be a proprietary protocol, a message in XML format, or a message in a standard EDI format (e.g, X12 standard).

Retrieving a kit from a vending machine.

A user stands in front of the vending machine 100. The user selects on the app from a list of kits (predefined groups of products) which the user wants dispensed from one or more vending machines nearby. By interacting with the app, a signal can be sent to the vending machine(s) 100 using one of a known number of protocols over one of a number of known networking technologies to indicate which coil(s) is/are going to be activated to dispense one or more items from the corresponding one or more coils.

The user then interacts with the device to indicate the transaction is complete. This interaction could be a Complete Order button press on the touchscreen of the mobile device 20, could be a voice command, could be a tap on the mobile device 20, or a tap on, in the case of a wearable, a body part near the wearable device. This interaction then creates a message with information about the product identifiers and the quantities actually dispensed and sends it over a network (wifi, Bluetooth, mesh network, Internet, cell, etc.) to a vendor's server, which records the transaction and updates the vendor's databases appropriately. The message could be a proprietary protocol, a message in XML format, or a message in a standard EDI format (e.g, X12 standard).

It is also contemplated that the user may place the device in front of a vending machine coil as described previously. If the product indicated by the position of the mobile device 20 is a part of a kit, the vending machine 100 may be caused to dispense all product within the kit based on this single transaction. As before, a user may also interact with the mobile device 20 to indicate that multiple kits are to be dispensed in this manner.

Retrieving after authorization, an item from a vending machine.

A user stands in front of the vending machine 100. The user selects on the app from a list of kits (predefined groups of products) which the user wants dispensed from one or more vending machines 100 nearby. A message is sent to the user's purchasing approver (text message, email, app, etc.) that the user is requesting authorization to dispense a kit. The approver approves the purchase. This approval process can also take place before the user stands in front of the vending machine 100.

Now that the user's request has been approved, by interacting with the app, a signal can be sent to the vending machine(s) 100 using one of a known number of protocols over one of a number of known networking technologies to indicate which coil(s) is/are going to be activated to dispense one or more items from the corresponding one or more coils.

The user then interacts with the mobile device 20 to indicate the transaction is complete. This interaction could be a Complete Order button press on the touchscreen of the mobile device 20, could be a voice command, could be a tap on the mobile device 20, or a tap on, in the case of a wearable, a body part near the wearable device 20. This interaction then creates a message with information about the product identifier and the quantity actually dispensed and sends it over a network (wifi, Bluetooth, mesh network, Internet, cell, etc.) to a vendor's server, which records the transaction and updates the vendor's databases appropriately. The message could be a proprietary protocol, a message in XML, format, or a message in a standard EDI format (e.g, X12 standard).

Starting a work day and retrieving a pre-authorized kit from the vending machine.

A user stands in front of the vending machine 100 at the start of a scheduled task or at the start of each day. When the user's identify is determined with biometric information on the mobile device (e.g., fingerprints, facial recognition, etc.) a signal can be sent to the vending machine(s) 100 using one of a known number of protocols over one of a number of known networking technologies to indicate which coil(s) is/are going to be activated to dispense one or more of predetermined items ("kit") from the corresponding one or more coils.

The user then interacts with the mobile device 20 to indicate the transaction is complete. This interaction could be a Complete Order button press on the touchscreen of the mobile device 20, could be a voice command, could be a tap on the mobile device 20, or a tap on, in the case of a wearable, a body part near the wearable device. This interaction then creates a message with information about the product identifiers and the quantities actually dispensed and sends it over a network (wifi, Bluetooth, mesh network, Internet, cell, etc.) to a vendor's server, which records the transaction and updates the vendor's databases appropriately. The message could be a proprietary protocol, a message in XML format, or a message in a standard EDI format (e.g, X12 standard).

In certain instances, it may be desired to have the transaction information sent and processed before the dispensing of products. In addition, it may be desired to provide product recommendations in connection with an item being taken from a bin or dispensed from a vending machine. For example, in a B2C context, having just reordered laundry soap, product recommendations for dryer sheets (the dryer likely nearby) and stain remover can be displayed on the mobile device. The product recommendations can also be communicated verbally.

For use in calibrating and tracking movement of the mobile device 20, the following programming instructions can be utilized by way of example only.

```
/****************** SETUP ******************/
/*     Configure ADXL345 Settings     */
void setup( ){
Serial.begin(9600);          // Start the serial terminal
Serial.println("SparkFun ADXL345 Accelerometer Hook Up Guide Example");
Serial.println( );
adxl.powerOn( );             // Power on the ADXL345
adxl.setRangeSetting(16);    // Give the range settings
                             // Accepted values are 2g, 4g, 8g or 16g
                             // Higher Values = Wider Measurement Range
                             // Lower Values = Greater Sensitivity
adxl.setSpiBit(0);           // Configure the device to be in 4 wire SPI mode when
     set to '0' or 3 wire SPI mode when set to 1
                             // Default: Set to 1
                             // SPI pins on the ATMega328: 11, 12 and 13 as reference in
     SPI Library
adxl.setActivityXYZ(1, 0, 0);   // Set to activate movement detection in the axes
     "adxl.setActivityXYZ(X, Y, Z);" (1 == ON, 0 == OFF)
adxl.setActivityThreshold(75);  // 62.5mg per increment // Set activity //
     Inactivity thresholds (0-255)
adxl.setInactivityXYZ(1, 0, 0); // Set to detect inactivity in all the axes
     "adxl.setInactivityXYZ(X, Y, Z);" (1 == ON, 0 == OFF)
adxl.setInactivityThreshold(75);// 62.5mg per increment // Set inactivity //
     Inactivity thresholds (0-255)
adxl.setTimeInactivity(10);  // How many seconds of no activity is inactive?
adxl.setTapDetectionOnXYZ(0, 0, 1); // Detect taps in the directions turned ON
     "adxl.setTapDetectionOnX(X, Y, Z);" (1 == ON, 0 == OFF)
// Set values for what is considered a TAP and what is a DOUBLE TAP (0-255)
adxl.setTapThreshold(50);    // 62.5 mg per increment
adxl.setTapDuration(15);     // 625 μs per increment
adxl.setDoubleTapLatency(80);   // 1.25 ms per increment
adxl.setDoubleTapWindow(200);   // 1.25 ms per increment
// Set values for what is considered FREE FALL (0-255)
adxl.setFreeFallThreshold(7);   //1(5 - 9) recommended - 62.5mg per increment
adxl.setFreeFallDuration(30);   //1(20 - 70) recommended - 5ms per increment
// Setting all interupts to take place on INT1 pin
//adxl.setImportantInterruptMapping(1, 1, 1, 1, 1);   // Sets
          "adxl.setEveryInterruptMapping(single tap, double tap, free fall, activity,
          inactivity),"
          // Accepts only 1 or 2 values for pins INT1 and INT2. This chooses the pin on
          the ADXL345 to use for Interrupts.
          // This library may have a problem using INT2 pin. Default to INT1 pin.
// Turn on Interrupts for each mode (1 == ON, 0 == OFF)
adxl.InactivityINT(1);
adxl.ActivityINT(1);
adxl.FreeFallINT(1);
adxl.doubleTapINT(1);
adxl.singleTapINT(1);
//attachInterrupt(digitalPinToInterrupt(interruptPin), ADXL_ISR, RISING);
          // Attach Interrupt
}
/**************** MAIN CODE ****************/
/*   Accelerometer Readings and Interrupt    */
void loop( ){
// Accelerometer Readings
int x,y,z;
adxl.readAccel(&x, &y, &z);         // Read the accelerometer values and store them in
variables declared above x,y,z
// Output Results to Serial
/* UNCOMMENT TO VIEW X Y Z ACCELEROMETER VALUES */
//Serial.print(x);
//Serial.print(", ");
//Serial.print(y);
//Serial.print(", ");
//Serial.println(z);
ADXL_ISR( );
```

```
// You may also choose to avoid using interrupts and simply run the functions within
ADXL_ISR( );
// and place it within the loop instead.
// This may come in handy when it doesn't matter when the action occurs.
}
```
***

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for using a mobile device to cause a vending machine to provide access to a product, comprising:
    establishing within the mobile device a calibration position relative to the vending machine via use of a signal received from a signal generating device associated with a predetermined location relative to the vending machine;
    using an accelerometer of the mobile device to determine a current location of the mobile device relative to the vending machine resulting from a movement of the mobile device from the calibration position;
    using a product location to mobile device location mapping to determine a one of a plurality of vending mechanisms associated with the vending machine that is to be activated given the determined current location of the mobile device; and
    sending a signal by the mobile device to the vending machine to instruct the vending machine to activate the determined one of the plurality of vending mechanisms.

2. The method as recited in claim 1, wherein the plurality of vending mechanisms comprises a plurality of rotating vending machine coils.

3. The method as recited in claim 1, wherein the plurality of vending mechanisms comprises a plurality of unlockable vending machine doors.

4. The method as recited in claim 1, wherein user input is required to be provided to the mobile device before the determined location of the mobile device is used to determine a one of the plurality of vending mechanisms associated with vending machine that is to be activated.

5. The method as recited in claim 1, wherein user input is required to be provided to the mobile device before the calibration position relative to the vending machine is established within the mobile device.

6. The method as recited in claim 1, comprising sending an authorization request to a server and sending the signal to the vending machine to instruct the vending machine to activate the determined one of the plurality of vending mechanisms only when a positive response is received in response to the authorization request.

7. The method as recited in claim 1, comprising using a camera of the mobile device to capture image data when sending the signal to the vending machine to instruct the vending machine to activate the determined one of the plurality of vending mechanisms.

8. The method as recited in claim 7, comprising uploading to a server device the image data captured by the camera.

9. The method as recited in claim 1, comprising causing the mobile device to transmit a signal to a vendor's server to thereby allow the vendor's server to record the provided access to the product.

10. A non-transitory, computer readable media having stored thereon instructions executable by a mobile device to cause a vending machine to provide access to a product, the instructions, when executed by the mobile device, causing the mobile device to perform steps comprising:
    establishing within the mobile device a calibration position relative to the vending machine via use of a signal received from a signal generating device associated with a predetermined location relative to the vending machine;
    using an accelerometer of the mobile device to determine a current location of the mobile device relative to the vending machine resulting from a movement of the mobile device from the calibration position;
    using a product location to mobile device location mapping to determine a one of a plurality of vending mechanisms associated with the vending machine that is to be activated given the determined current location of the mobile device; and
    sending a signal to the vending machine to instruct the vending machine to activate the determined one of the plurality of vending mechanisms.

11. The non-transitory, computer readable media as recited in claim 10, wherein the plurality of vending mechanisms comprises a plurality of rotating vending machine coils.

12. The non-transitory, computer readable media as recited in claim 10, wherein the plurality of vending mechanisms comprises a plurality of unlockable vending machine doors.

13. The non-transitory, computer readable media as recited in claim 10, wherein user input is required to be provided to the mobile device before the determined location of the mobile device is used to determine a one of the plurality of vending mechanisms associated with vending machine that is to be activated.

14. The non-transitory, computer readable media as recited in claim 10, wherein user input is required to be provided to the mobile device before the calibration position relative to the vending machine is established within the mobile device.

15. The non-transitory, computer readable media as recited in claim 10, wherein the instructions further cause the mobile device to send an authorization request to a server and wherein sending the signal to the vending machine to instruct the vending machine to activate the determined one of the plurality of vending mechanisms is performed only when a positive response is received in response to the authorization request.

16. The non-transitory, computer readable media as recited in claim 10, wherein the instructions further cause a camera of the mobile device to be used to capture image data when sending the signal to the vending machine to instruct the vending machine to activate the determined one of the plurality of vending mechanisms.

17. The non-transitory, computer readable media as recited in claim 16, comprising uploading to a server device the image data captured by the camera.

18. The non-transitory, computer readable media as recited in claim 10, wherein the instructions further cause the mobile device to transmit a signal to a vendor's server to thereby allow the vendor's server to record the provided access to the product.

19. A method for using a mobile device to cause a vending machine to provide access to a product, comprising:
  establishing within the mobile device a calibration position relative to the vending machine;
  using an accelerometer of the mobile device to determine a current location of the mobile device relative to the vending machine resulting from a movement of the mobile device from the calibration position;
  using a product location to mobile device location mapping to determine a one of a plurality of vending mechanisms associated with the vending machine that is to be activated given the determined current location of the mobile device;
  sending a signal by the mobile device to the vending machine to instruct the vending machine to activate the determined one of the plurality of vending mechanisms; and
  causing the mobile device to transmit a signal to a vendor's server to thereby allow the vendor's server to record the provided access to the product.

20. A method for using a mobile device to cause a vending machine to provide access to a product, comprising:
  establishing within the mobile device a calibration position relative to the vending machine;
  using an accelerometer of the mobile device to determine a current location of the mobile device relative to the vending machine resulting from a movement of the mobile device from the calibration position;
  using a product location to mobile device location mapping to determine a one of a plurality of vending mechanisms associated with the vending machine that is to be activated given the determined current location of the mobile device;
  sending a signal by the mobile device to the vending machine to instruct the vending machine to activate the determined one of the plurality of vending mechanisms; and
  using a camera of the mobile device to capture image data when sending the signal to the vending machine to instruct the vending machine to activate the determined one of the plurality of vending mechanisms.

21. A non-transitory, computer readable media having stored thereon instructions executable by a mobile device to cause a vending machine to provide access to a product, the instructions, when executed by the mobile device, causing the mobile device to perform steps comprising:
  establishing within the mobile device a calibration position relative to the vending machine;
  using an accelerometer of the mobile device to determine a current location of the mobile device relative to the vending machine resulting from a movement of the mobile device from the calibration position;
  using a product location to mobile device location mapping to determine a one of a plurality of vending mechanisms associated with the vending machine that is to be activated given the determined current location of the mobile device;
  sending a signal to the vending machine to instruct the vending machine to activate the determined one of the plurality of vending mechanisms; and
  causing the mobile device to transmit a signal to a vendor's server to thereby allow the vendor's server to record the provided access to the product.

22. A non-transitory, computer readable media having stored thereon instructions executable by a mobile device to cause a vending machine to provide access to a product, the instructions, when executed by the mobile device, causing the mobile device to perform steps comprising:
  establishing within the mobile device a calibration position relative to the vending machine;
  using an accelerometer of the mobile device to determine a current location of the mobile device relative to the vending machine resulting from a movement of the mobile device from the calibration position;
  using a product location to mobile device location mapping to determine a one of a plurality of vending mechanisms associated with the vending machine that is to be activated given the determined current location of the mobile device;
  sending a signal to the vending machine to instruct the vending machine to activate the determined one of the plurality of vending mechanisms; and
  causing a camera of the mobile device to be used to capture image data when sending the signal to the vending machine to instruct the vending machine to activate the determined one of the plurality of vending mechanisms.

* * * * *